Patented Feb. 25, 1941

2,233,130

UNITED STATES PATENT OFFICE 2,233,130

PROCESS FOR THE MANUFACTURE OF DIANISIDINE

Clyde O. Henke, Wilmington, Del., and Roland G. Benner, Carneys Point, N. J., assignors to E. I. du Pont de Nemours & Company, Wilmington, Del., a corporation of Delaware No Drawing. Application November 8, 1939, Serial No. 303,477

7 Claims. (Cl. 260—571)

This invention relates to a process for the manufacture of dianisidine and, more particularly, to the production of dianisidine from o-nitroanisole by catalytic hydrogenation in the liquid phase.

Dianisidine has heretofore been produced on a commercial scale by reduction of o-nitroanisole with zinc dust and caustic soda to hydrazoanisole, which is inverted to dianisidine by dilute acids. Although fairly good yields of dianisidine are obtainable by this method, the cost of production has been high because of the high cost of zinc dust and the expense resulting from difficulties involved in separating the zinc sludge from the reduction mass.

Hydrogen has been found to be more economical for reduction of many nitro bodies to the amines than either of the older methods which involve the use of zinc or iron. However, no method has been previously developed for the production of dianisidine from o-nitroanisole with hydrogen.

Nitrobenzene has been reduced with hydrogen in the presence of a nickel catalyst and caustic soda to azobenzene and hydrazobenzene, which can be converted to benzidine by known methods. However, this method is not satisfactory for the manufacture of dianisidine from o-nitroanisole as very low yields of dianisidine are obtained.

This invention has as an object an improved and economical process for the production of dianisidine. A further object is the production of dianisidine of high quality by hydrogen reduction of o-nitroanisole.

These objects are accomplished by the following invention which comprises reducing o-nitroanisole with hydrogen in the presence of a practical amount of an active noble metal catalyst, in an alkaline medium and in an oxygen-containing, non-acidic, organic solvent having from 1 to 7 carbon atoms.

o-Nitroanisole is reduced to a mixture of hydrazoanisole, o-anisidine, and a small amount of azoanisole at temperatures below 125° C. and at hydrogen pressures above one atmosphere, in an oxygen-containing non-acidic, organic solvent having from 1 to 7 carbon atoms, in the presence of an active noble metal cataylst, and in an alkaline medium. The mixture is treated with hydrochloric acid and iron to convert the azo-hydrazo-anisole to dianisidine hydrochloride and the o-anisidine to its hydrochloride. The o-anisidine hydrochloride is separated from the dianisidine hydrochloride by filtration, converted to o-anisidine by the addition of lime, and distilled. The dianisidine hydrochloride is washed free of isomers, o-anisidine, and solvent, and is converted to dianisidine by soda ash.

The following examples set forth certain well defined instances of the application of this invention. They are, however, not to be considered as limitations thereof since many modifications may be made without departing from the spirit and scope of this invention.

Example I

In an iron autoclave equipped for rapid agitation are charged 100 parts of o-nitroanisole, 150 parts of isopropanol, 6 parts of caustic soda, and 0.015 part of palladium black supported on activated carbon. The charge is hydrogenated at 55° to 60° C. and under 100 to 200 lbs. per sq. in. hydrogen pressure. The absorption of hydrogen is continued until it becomes very slow. The hydrogenated mass is then taken from the autoclave, the autoclave washed and the washings combined with the mass. The charge is then cooled to 20° to 30° C. Water is added and the mixture is cooled to —2° to —8° C. While this temperature is maintained, 140 parts of 33% hydrochloric acid are added to invert the hydrazoanisole to dianisidine hydrochloride. After agitating for 4 hours at this temperature, 5 parts of iron powder are added. The agitation is continued at 0° to 10° C. until the mass becomes gray. This will require about 8 hours. 60 parts of salt are then added and the dianisidine hydrochloride is filtered out and washed with cold 8% salt solution. The filtrate is made alkaline with lime and is then steam-distilled to recover the isopropanol and o-anisidine. The dianisidine hydrochloride is dissolved in boiling water and is filtered at 100° to 101° C. The sludge is washed with boiling water, the filtrates being combined. The filtrate is agitated while cooling to 0° to —2° C. and the dianisidine hydrochloride which crystallizes out is filtered and washed with cold water. The filtrate and water wash, which are saturated with dianisidine hydrochloride, are saved for use in place of water in subsequent inversions. The dianisidine hydrochloride is slurried in water and is converted to dianisidine by the addition of soda ash until the slurry is alkaline. It is then cooled to 20° to 30° C., filtered, and washed with cold water. The dianisidine is dried at 90° to 100° C. under vacuum. The material is white and has a freezing point of 135.5° to 137° C.

Example II

In an iron autoclave equipped for rapid agitation are charged 100 parts of o-nitroanisole, 150 parts of the azeotropic mixture of isopropanol and water, 6 parts of caustic soda, and 0.020 part of palladium black supported on activated carbon. The charge is hydrogenated and the hydrogenated mass is converted to dianisidine and o-anisidine in a manner similar to Example I.

*Example III*

In an iron autoclave equipped for rapid agitation are charged 100 parts of o-nitroanisole, 150 parts of the azeotropic mixture of isopropanol and water, 18 parts of caustic soda, and 0.020 part of palladium black supported on activated carbon. The charge is hydrogenated and the hydrogenated mass is converted to dianisidine and o-anisidine in a manner similar to Example I.

*Example IV*

In an iron autoclave equipped for rapid agitation are charged 100 parts of o-nitroanisole, 150 parts of the azeotropic mixture of isopropanol and water, 29 parts of 40% caustic soda, and 0.020 part of palladium black supported on activated carbon. The charge is hydrogenated and the hydrogenated mass is converted to dianisidine and o-anisidine in a manner similar to Example I.

*Example V*

In an iron autoclave equipped for rapid agitation are charged 100 parts of o-nitroanisole, 100 parts of the azeotropic mixture of isopropanol and water, 6 parts of caustic soda, and 0.020 part of palladium black supported on activated carbon. The charge is hydrogenated and the hydrogenated mass is converted to dianisidine and o-anisidine in a manner similar to Example I.

*Example VI*

In an iron autoclave equipped for rapid agitation are charged 100 parts of o-nitroanisole, 200 parts of isopropanol, 14 parts of 40% caustic soda, and 0.020 part of palladium black supported on activated carbon. The charge is hydrogenated and the hydrogenated charge is converted to dianisidine and o-anisidine in a manner similar to Example I.

*Example VII*

In an iron autoclave equipped for rapid agitation are charged 100 parts of o-nitroanisole, 150 parts of methanol, 6 parts of caustic soda, and 0.030 part of palladium black supported on activated carbon. The charge is hydrogenated and the hydrogenated mass is converted to dianisidine and o-anisidine in a manner similar to Example I.

*Example VIII*

In an iron autoclave equipped for rapid agitation are charged 100 parts of o-nitroanisole, 150 parts of ethanol, 6 parts of caustic soda, and 0.030 part of palladium black supported on activated carbon. The charge is hydrogenated and the hydrogenated charge is converted to dianisidine and o-anisidine in a manner similar to Example I.

*Example IX*

In an iron autoclave equipped for rapid agitation are charged 100 parts of o-nitroanisole, 150 parts of n-butanol, 6 parts of caustic soda, and 0.030 part of palladium black supported on activated carbon. The charge is hydrogenated and the hydrogenated mass is converted to dianisidine and o-anisidine in a manner similar to Example I.

*Example X*

In an iron autoclave equipped for rapid agitation are charged 100 parts of o-nitroanisole, 150 parts of tertiary-butanol, 6 parts of caustic soda, and 0.030 part of palladium black supported on activated carbon. The charge is hydrogenated and the hydrogenated mass is converted to dianisidine and o-anisidine in a manner similar to Example I.

*Example XI*

In an iron autoclave equipped for rapid agitation are charged 100 parts of o-nitroanisole, 150 parts of fusel oil, 6 parts of caustic soda, and 0.030 part of palladium black supported on activated carbon. The charge is hydrogenated and the hydrogenated mass is converted to dianisidine and o-anisidine in a manner similar to Example I.

*Example XII*

In an iron autoclave equipped for rapid agitation are charged 100 parts of o-nitroanisole, 150 parts of n-hexanol, 6 parts of caustic soda, and 0.030 part of palladium black supported on activated carbon. The charge is hydrogenated and the hydrogenated mass is converted to dianisidine and o-anisidine in a manner similar to Example I.

*Example XIII*

In an iron autoclave equipped for rapid agitation are charged 100 parts of o-nitroanisole, 150 parts of cyclohexanol, 6 parts of caustic soda, and 0.030 part of palladium black supported on activated carbon. The charge is hydrogenated and the hydrogenated mass is converted to dianisidine and o-anisidine in a manner similar to Example I.

*Example XIV*

In an iron autoclave equipped for rapid agitation are charged 100 parts of o-nitroanisole, 150 parts of isopropanol, 6 parts of caustic soda, and 0.018 part of platinum black supported on activated carbon. The charge is hydrogenated and the hydrogenated mass is converted to dianisidine and o-anisidine in a manner similar to Example I.

*Example XV*

In an iron autoclave equipped for rapid agitation are charged 100 parts of o-nitroanisole, 150 parts of isopropanol, 6 parts of caustic soda, and 0.050 part of rhodium black supported on activated carbon. The charge is hydrogenated and the hydrogenated mass is converted to dianisidine and o-anisidine in a manner similar to Example I.

*Example XVI*

In an iron autoclave equipped for rapid agitation are charged 100 parts of o-nitroanisole, 150 parts of isopropanol, 5 parts of slaked lime, and 0.030 part of palladium black supported on activated carbon. The charge is hydrogenated and the hydrogenated mass is converted to dianisidine and o-anisidine in a manner similar to Example I.

*Example XVII*

In an iron autoclave equipped for rapid agitation are charged 100 parts of o-nitroanisole, 100 parts of n-propanol, 100 parts of methanol, 100 parts of water, 29 parts of 40% caustic soda, and 0.050 part of palladium black supported on activated carbon. The charge is hydrogenated and the hydrogenated charge is converted to dianisidine and o-anisidine in a manner similar to Example I.

Example XVIII

In an iron autoclave equipped for rapid agitation are charged 100 parts of o-nitroanisole, 150 parts of n-propanol, 100 parts of water, 43 parts of 40% caustic soda, and 0.050 part of palladium black supported on activated carbon. The charge is hydrogenated and the hydrogenated mass is converted to dianisidine and o-anisidine in a manner similar to Example I.

Example XIX

In an iron autoclave equipped for rapid agitation are charged 100 parts of o-nitroanisole, 100 parts of tertiary-butanol, 100 parts of water, 29 parts of 40% caustic soda, and 0.050 part of palladium black supported on activated carbon. The charge is hydrogenated and the hydrogenated mass is converted to dianisidine and o-anisidine in a manner similar to Example I.

This invention is not limited to the particular conditions cited in the above examples.

The rate of reaction is greatly influenced by the temperature, higher temperatures increasing the reduction rate, but better yields are obtained within the range of 50° to 65° C. However, the hydrogenation may be carried out at from 30° to 125° C.

Hydrogen pressures of 50 to 300 lbs. per sq. in. are preferable but any pressure from atmospheric to 2000 lbs. per sq. in. and higher may be employed, the construction of the equipment limiting the upper pressures.

The proportion of solvent to o-nitroanisole is best kept between 25% and 3 times the weight of nitro body, but the solvent may be varied from 15% to 5 times the weight of o-nitroanisole, the lower proportion resulting in more o-anisidine formation but faster reduction. The solvent used need not be one of those mentioned in the examples cited, although isopropanol is the most efficient. The solvent used should be an oxygen-containing, non-acidic, organic compound of from 1 through 7 carbon atoms. This would include all aliphatic, cyclic and aromatic alcohols, ketones, aldehydes, esters, and ethers of from 1 through 7 carbons. While ethers fall into this category, the hazards involved in their use make it inadvisable to employ them. Mixtures of the above solvents or materials resulting in the formation of them are included. Examples of these are: methanol, ethanol, n-propanol, isopropanol, n-butanol, secondary-butanol, isobutanol, tertiary-butanol, n-amyl alcohol, isoamyl alcohol, tertiary-amyl alcohol, fusel oil, "Pentasol" (a commercial mixture of amyl alcohols), n-hexanol, acetone, methyl ethyl ketone, diethyl ketone, formaldehyde, acetaldehyde, propionaldehyde, butyraldehyde, cyclohexanol, benzyl alcohol, etc.

The amount of catalyst employed is preferably between 0.005 and 0.050%, based on the weight of nitro body, but may be decreased, as long as it shows activity, or increased as desired. The use of more than 0.5% noble metal in the catalyst, based on the nitroanisole, makes the process impractical due to the cost of the metal. The catalyst may be palladium black, platinum black or rhodium black, and is preferably prepared in accordance with U. S. application Serial No. 303,475, filed on even date herewith. However, the noble metal compounds may be used, as well as mixtures or other physical forms of the metals, such as colloids and the like. They are preferably supported on activated carbon but they may be unsupported or supported on any inert carrier such as, for example, charcoal, kieselguhr, asbestos, fuller's earth, filtercel, bentonite, vermiculite, monox, silica, and the like. The catalyst may be recovered by filtering the autoclave charge or it may be filtered off with the unreacted iron after the inversion is completed.

The alkaline material is preferably from 3 to 10% of caustic soda based on the weight of o-nitroanisole, but the proportion may be varied from 0.5 to 50% or more of the weight of nitro body. The equivalent of any material resulting in an alkaline medium under the conditions employed may also be used. Lower alkalinity decreases the yield of dianisidine; more alkaline material decreases the rate of reduction. The most common alkaline materials are the oxides, hydroxides, salts of weak acids, alcoholates, and phenolates of the alkali and of the alkaline earth metals, as well as strong organic bases or salts, various compounds of the nitrogen system, and various compounds of other metals, such as magnesium. Examples of the above are: sodium hydroxide, potassium hydroxide, calcium hydroxide, barium hydroxide, strontium hydroxide, ammonium hydroxide, sodium carbonate, potassium carbonate, sodium oxide, potassium oxide, calcium oxide, barium oxide, strontium oxide, sodium acetate, potassium acetate, calcium acetate, barium acetate, strontium acetate, sodium stearate, potassium stearate, sodium silicates, potassium silicates, trisodium phosphate, tripotassium phosphate, etc. Free alkali and alkaline earth metals will react to produce an alkaline medium. The essential detail is that the charge to be hydrogenated should be in an alkaline medium.

Water may or may not be present in the charge to be hydrogenated, preferably absent. If water is to be present, it may be added separately or by means of an aqueous solution of the solvent or of the alkaline material. The azeotropic mixture of isopropanol and water cited in some of the examples contains about 88% isopropanol.

The hydrogen employed is preferably electrolytic hydrogen gas but it may be obtained from any other source, and gases containing hydrogen, such as water-gas, may be used.

The method for working up the hydrogenated charge for its dianisidine and o-anisidine content and for recovery of the solvent is not limited to the method used in Example I, but may be varied considerably. There are several well-known methods for converting the reduction mass to dianisidine and o-anisidine.

By the preceding methods, dianisidine of exceptionally high purity is obtainable with considerably more economy than by previous commercial methods. Yields up to 70% of theory of dianisidine are obtainable with o-anisidine as a valuable by-product. At least 80 to 90% of theory of useful products is obtainable.

It is apparent that many widely different embodiments of this invention may be made without departing from the spirit and scope thereof and therefore it is not intended to be limited except as indicated in the appended claims.

We claim:
1. The process which comprises catalytically hydrogenating o-nitroanisole in an alkaline medium and in an oxygen-containing, non-acidic, organic solvent having from 1 to 7 carbon atoms while in contact with a noble metal hydro- genation catalyst at a temperature within the range of 30° to 125° C.

2. The process in accordance with claim 1 characterized in that the organic solvent is an alcohol.

3. The process in accordance with claim 1 characterized in that the organic solvent is an aliphatic alcohol.

4. The process in accordance with claim 1 characterized in that the organic solvent is isopropanol.

5. The process in accordance with claim 1 characterized in that the catalyst is a palladium catalyst.

6. The process in accordance with claim 1 characterized in that the alkaline medium is a sodium hydroxide medium.

7. The process which comprises catalytically hydrogenating o-nitroanisole in the presence of a palladium catalyst in isopropyl alcohol and in a sodium hydroxide medium at a temperature within the range of 30° to 125° C.

CLYDE O. HENKE.
ROLAND G. BENNER.